Jan. 26, 1971  D. E. ALGIRE  3,558,180
BED ATTACHMENT FOR TRACTOR CABS
Filed May 27, 1969  3 Sheets-Sheet 1

Dean E. Algire
INVENTOR.

BY *Clarence A. O'Brien*
and *Harvey B. Jacobson*
Attorneys

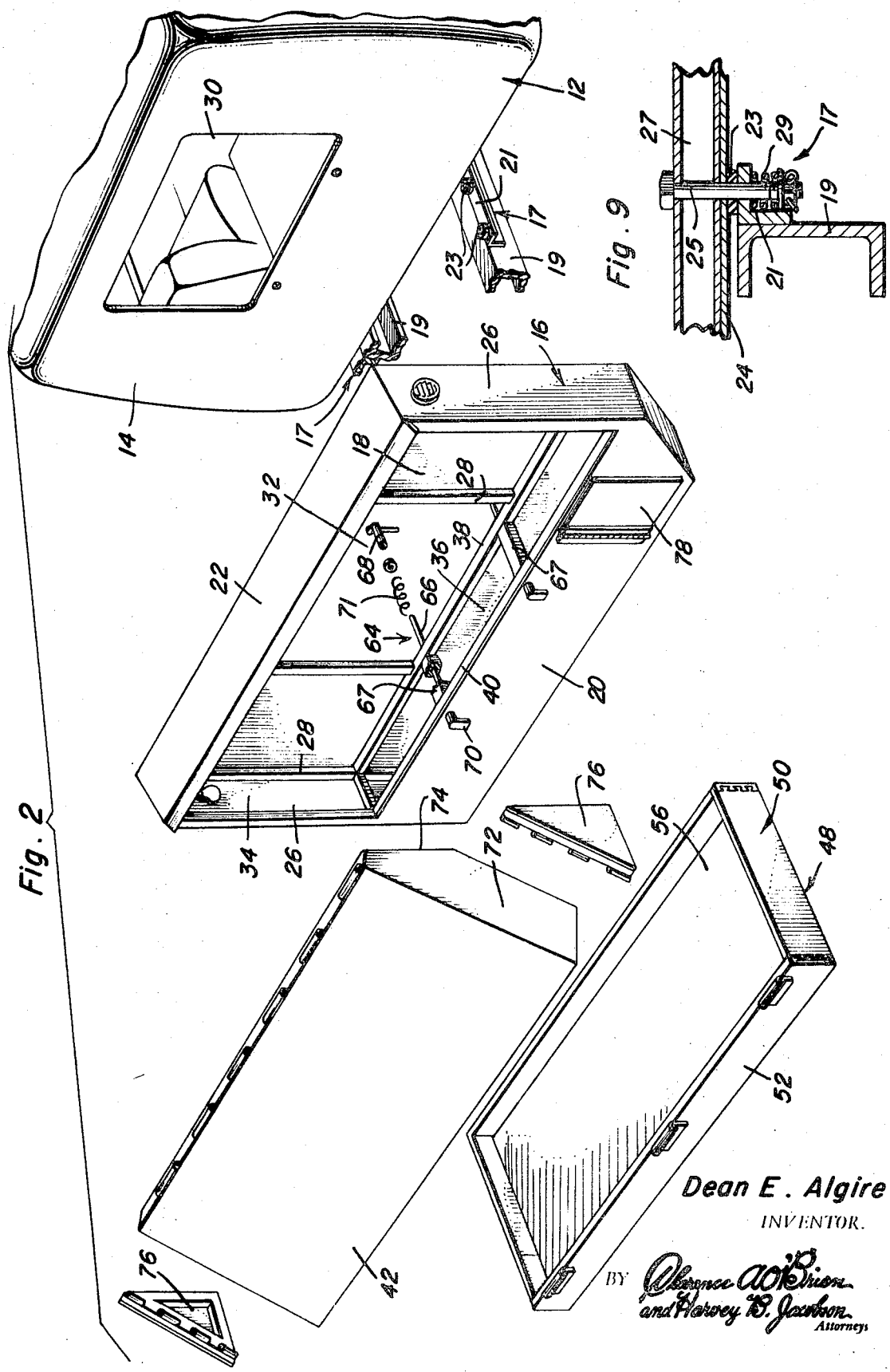

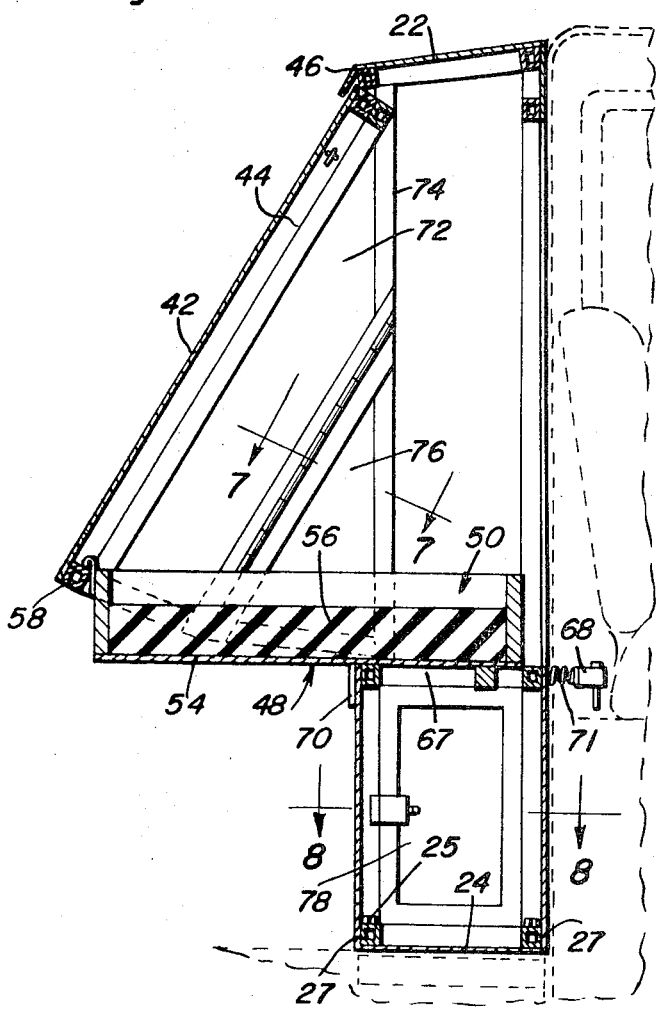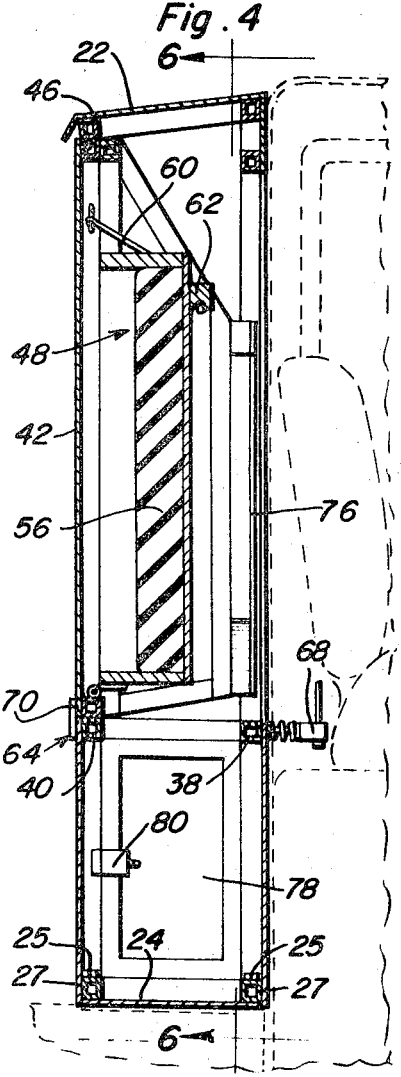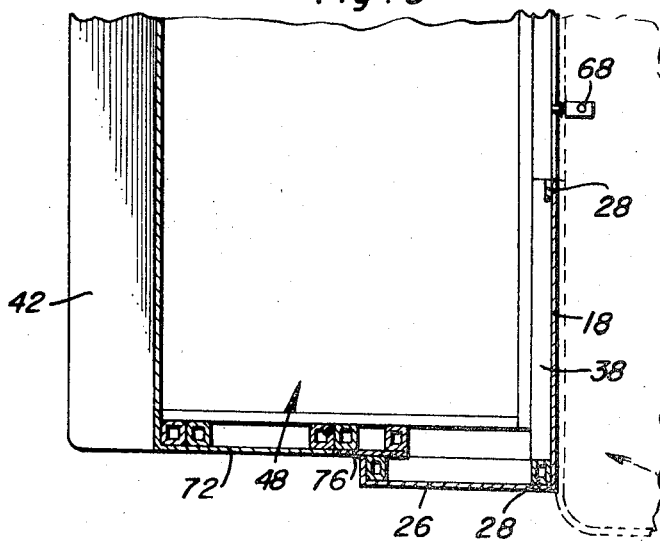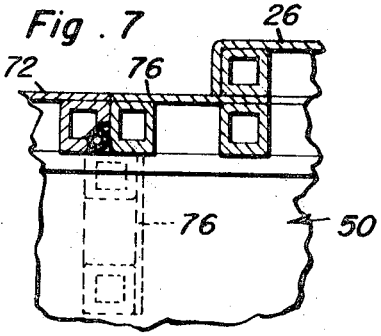

United States Patent Office 3,558,180
Patented Jan. 26, 1971

3,558,180
BED ATTACHMENT FOR TRACTOR CABS
Dean E. Algire, 764 Upper Fredericktown Road,
Mount Vernon, Ohio 43050
Filed May 27, 1969, Ser. No. 828,311
Int. Cl. B60p 3/34
U.S. Cl. 296—23                                10 Claims

ABSTRACT OF THE DISCLOSURE

A collapsible bunk bed unit mountable on the rear of a tractor cab as an attachment therefor. The unit includes a main body which incorporates a lower storage compartment and an upper bed-receiving compartment within which the bed itself can be selectively stored vertically or positioned horizontally. Protective paneling is hingedly engaged between the main body and the bed support frame so as to extend rearwardly from the main body in a bed covering manner when the bed is opened for use and so as to fold inwardly and form an enclosure for the rear of the main body when the bed is collapsed.

---

The instant invention is generally concerned with bunk units for tractor cabs, and more particularly relates to a collapsible unit specifically adapted for mounting on the rear wall of a conventional cab so as to provide in effect an integral sleeping unit therefor.

In addition to the provision of a bunk bed attachment for tractor cabs for the purpose of providing a sleeping compartment immediately to the rear of the cab itself, it is a highly significant object of the instant invention to provide such an attachment which is collapsible so as to, during periods of nonuse, occupy a minimum amount of space directly adjacent the rear wall of the cab itself.

In conjunction with the highly desirable collapsible nature of the attachment, the specific construction thereof provides for, in the open or usable position of the bunk bed, a comfortable and stably supported unit for sleeping purposes.

The basic objects of the instant invention are achieved through the provision of a vertical main body which incorporates a lower storage compartment and an upper bed-receiving compartment. The rear wall portion of the bed compartment is in the nature of an outwardly swinging cover panel with the bed unit itself being hingedly mounted and cooperating with the cover panel so as to assume a vertical collapsed orientation within the relatively narrow main body upon a collapsing of the bed attachment, and to also assume a horizontal orientation, projecting rearwardly from the main enclosure or body with the rear cover panel pivotally swinging outward thereover so as to completely enclose the horizontally positioned bed. Collapsible side covering panels are also provided so as to effect a complete enclosure of the horizontally orientated bed rearward of the main storage unit or body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an exploded perspective view of the various components of the attachment as well as the rear wall of a cab;

FIG. 3 is an enlarged cross-sectional view taken substantially on a plane passing along line 3—3 in FIG. 1;

FIG. 4 is a cross-sectional view similar to FIG. 3 with the attachment collapsed;

FIG. 5 is a partial cross-sectional view taken substantially on a plane passing along line 5—5 in FIG. 1;

FIG. 7 is a cross-sectional detail taken substantially on a plane passing along line 7—7 in FIG. 3;

FIG. 9 is an enlarged cross-sectional detail illustrating the fixing of the bed attachment to the truck frame.

Figure 1:
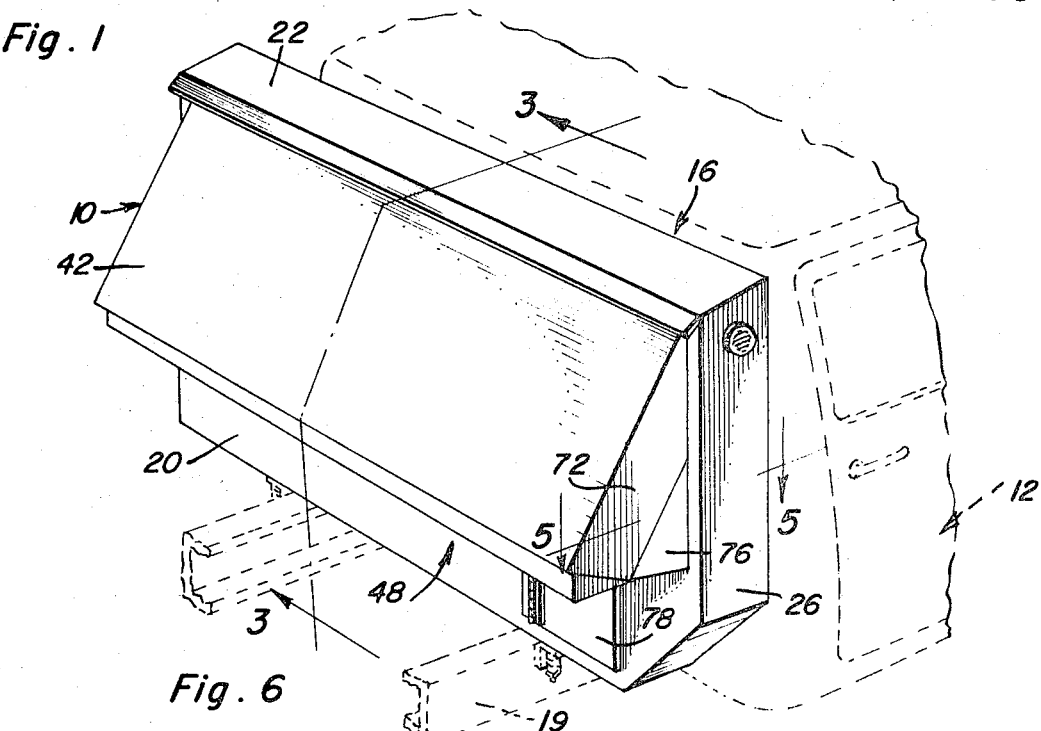
FIG. 1 is a perspective view of the bed attachment mounted on a tractor cab, the cab illustrated in phantom lines.
Figure 6:
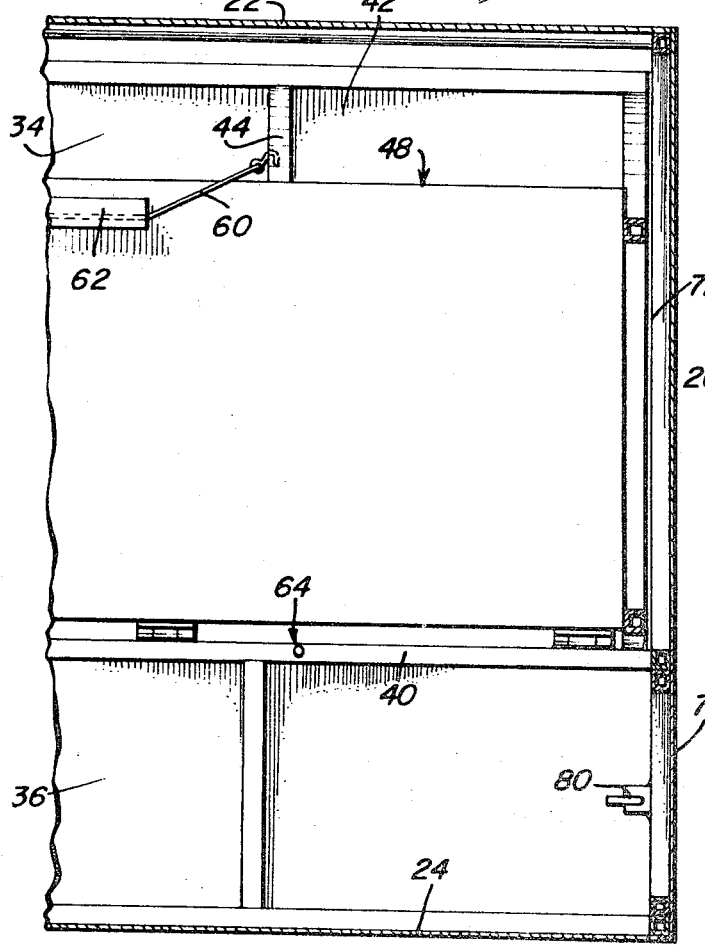
FIG. 6 is a partial cross-sectional view taken substantially on a plane passing along line 6—6 in FIG. 4.

Referring now more specifically to the drawings, reference numeral 10 is used to designate the bed attachment for tractor cabs, reference numeral 12 designating a conventional tractor cab, the back wall 14 of which is to receive the attachment 10.

The bed attachment 10 includes a vertically orientated relatively narrow rectangular main body or compartment forming unit 16. The unit 16 includes a front wall 18, a rear wall 20, top and bottom walls 22 and 24, and opposed vertical side walls 26. These walls 18 through 26 are formed of flat panels internally rigidified by a framework of hollow tubular members.

The unit 16 is positioned with the front wall 18 thereof against the rear wall 14 and is bolted directly thereto through the internal structural members 28 backing up and rigidifying the front wall 18. The bottom wall 24 sits on a pair of cushioned mounts 17 fixed to the truck frame beams 19. Each mount includes an angle member 21 having a horizontal flange supporting a pair of rubber sleeves 23. A bolt 25 extends through each sleeve 23, the overlying bottom wall 24 and a bottom rigidifying frame member 27, and the underlying horizontal flange. Each bolt is also spring loaded by means of a compression spring 29 retained on the lower end thereof by a nut and cotter key. In order to provide access from the tractor cab 12 to the mounted attachment 10, an access opening 30 is provided through the rear wall 14, the front wall 18 of the unit 16 having a similar opening 32 in alignment therewith.

The main body unit 16 is autually divided into an enlarged upper bed receiving compartment 34 and a lower storage compartment 36 by means of a pair of laterally spaced horizontal structural members or beams 38 and 40, such beams constituting portions of the body wall supporting framework, the beam 38 being associated with the front wall 18 and the beam 40 being associated with and stabilizing the rear wall 20. Actually, the rear wall 20 encloses only the lower or storage compartment 36 from the beam 40 downward, while a hingedly mounted cover panel 42 is utilized thereabove. The panel 42, also provided with a structural framework 44, is hingedly secured along the upper edge thereof to the rear edge of the top wall 22, or more particularly a structural beam 46 extending therealong, whereby a swinging of the panel 42 between a first vertical position paralleling the lower rear wall 20 and a second rearwardly and outwardly swung position relative thereto is possible.

The actual bed 48 consists of a rectangular box 50, including a peripheral wall 52 and a bottom 54, within which an appropriate mattress 56 is provided. The bed box 50, along the rear edge thereof, is hingedly secured to the lower edge of the closure panel 42, and more particularly a rigidifying beam 58 extending therealong. Mounted in this manner, the bed unit 48 can swing between a position paralleling and lying adjacent the inner side of the panel 42, and a second position downwardly angled relative thereto. It is contemplated that the swinging movement of the bed unit 48 be effected in conjunction with the aforedescribed swinging movement of the closure panel 42 relative to the main body unit 16 whereby the bed attachment can be shifted easily between the open position of FIG. 3 and the closed position of FIG. 4.

It will be appreciated that the closure or covering panel 42, as well as the bed unit 48, are of a length so as to closely conform to the width of the upper bed receiving compartment 34. When the bed unit 48 is open for use, as in FIG. 3, the mattress supporting box 50 is supported directly on the horizontal rear wall beam 40, this of course being in addition to the hinged engagement with the now outwardly swung rear covering panel 42. The forward edge of the bed box unit 48 in turn engages against the vertical structural members 28, or selected ones thereof, which constitute the framework for the front wall 18. When a closing of the attachment 10 is to be effected, the bed unit 48 is swung upwardly against the simultaneous inwardly swinging panel 42 and is secured thereagainst by means of a cable 60, preferably slightly elastic, which has the opposite end portions thereof affixed to the panel 42, or structural components associated therewith, and the intermediate portion thereof looped over the now upward edge of the box 48 and about a grooved block 62 affixed to the bottom 54 of the box 48. The covering panel 42 is itself maintained in the vertical bed storing position of FIG. 4 by means of a pair of latch units 64. Each latch unit 64 includes an elongated rod 66 which extends rotatably through a hollow rectangular beam 67 extending between the two support beams 38 and 40. Each rod also extends through the beams 38 and 40. A control handle 68 is mounted on the inner end of each rod 66 and readily accessible within the tractor cab 12, while a retaining laterally directed latch 70 is mounted on the opposite end of each rod 66 and positioned immediately beyond the rear wall 20 whereby a selective locking and releasing of the panel 42 can be easily effected. In other words, the latches 70 will be downwardly turned, as in FIGS. 2 and 3, when the bed unit is to be in the usable position thereof, and upwardly directed so as to engage against the closed panel 42 when a storage of the unit is to be effected, as in FIG. 4. Suitable means, such as a compression spring 71, can be provided for releasably retaining each of the latch units 64 in both the locked and unlocked position so as to avoid any accidental displacement thereof.

It will of course be appreciated that both the foot and the head of the bed unit 48 will necessarily have to be enclosed or protected during the use thereof. As such, the closure or covering panel 42 is provided, at the opposite ends thereof, with vertical forwardly directed end panels 72 rigid therewith and of a width slightly less than the depth of the main body unit 16 so as to be received fully therein. The upper edge 74 of each of the side panels is beveled so as to conform to the outwardly swung angle of the covering panel 42 and overlie the rear edge of the corresponding side wall 26. Finally, a triangularly shaped filler panel 76 is hingedly secured to the inner edge of each side panel 72 so as to complete the enclosure of the opposite ends of the open bed unit. These filler panels 76, subsequent to an upward folding of the bed unit 48, swing inwardly thereagainst, note particularly FIG. 4, and overlie the bottom 54 of the now vertically positioned bed unit 48 so as to allow for a complete reception of the side panels within the upper chamber 34 of the main body unit 16 as the covering panel 42 is swung to its closed position. These filler panels 76 are of a size so as to, in the open position of the attachment, have the inner edges thereof just overlie the side walls 26 of the unit 16 and thereby be retained between the downwardly swung bed box 50 and the side walls 26. As will be appreciated from the drawings, each of the panels are to be internally rigidified by appropriate structural members, such structural members actually mounting the various hinge units, note for example FIG. 7 wherein the hinged engagement between one of the filler panels 76 and the adjacent side panel 72 has been illustrated. It should also be appreciated that the rigidifying structural members on the adjacent panels and walls act in the manner of positioning stops so as to assist in the alignment of the various hingedly interconnected parts.

Figure 8:
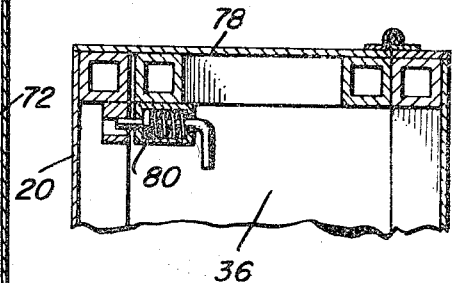
FIG. 8 is a cross-sectional detail taken substantially on a plane passing along line 8—8 in FIG. 3.

As previously mentioned, the lower portion of the main body unit 6 is to constitute a storage chamber 36, the bed unit 48 being supported and stored thereabove. The storage chamber, for tools, or various supplies, will normally be provided with two or more access panels 78 one provided in the back wall 20 and the other in one of the side walls 26. Each of these access panels, noting FIG. 8 in particular, is to be opened from the interior of the storage unit 36 and is to incorporate an appropriate spring-loaded latch 80 which effects a positive locking of the closure panels 78 until manually released from the interior of the storage chamber 36 which is in turn accessible from the interior of the cab 12 upon a raising of the bed unit 48. In this manner, the necessity of providing external or individual locks on the access panels 78 is avoided in that a locking of the tractor cab 12 itself precludes any possibility of unauthorized entry into the storage chamber 36.

From the foregoing, it will be appreciated that a highly unique attachment has been defined so as to provide for a sleeping unit immediately to the rear of and in communication with a tractor cab, the sleeping unit being collapsible so as to, when collapsed, require only a minimum amount of space immediately behind the rear wall of the cab. By the same token, when open for use, while providing adequate sleeping room, does so without requiring any substantial amount of space such as to constitute an interference with the operation of the cab or the trailer to be pulled thereby.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bed attachment for tractor cabs including front, rear, top, bottom and side walls defining a generally rectangular body unit, said body unit including upper and lower internal chambers, the front wall being mountable adjacent the rear wall of a tractor cab and having an enlarged access opening defined through the upper portion thereof into communication with the upper body unit chamber for access thereto from the interior of a tractor cab, an enlarged back panel defining the upper portion of the rear wall corresponding to the upper chamber, means hingedly engaging the upper edge of the back panel with the top wall for swinging movement of the back panel between a first vertical position substantially in the plane of the rear wall and a second rearwardly and outwardly swung position, a bed unit positioned within the body unit and extending longitudinally between the front and rear walls, said bed unit including forward and rearward side edges, means hingedly securing the rearward side edge of the bed unit to the lower edge of the back panel for swinging movement of the bed unit relative to the back panel between a first vertical position paralleling the back panel when the back panel is in its first vertical position and a second horizontal position extending between the lower edge of the back panel in the outwardly swung second position thereof and the front wall, and a rigid member spanning the body unit between the upper and lower chambers and constituting a support for the bed unit in the second position thereof in conjunction with the means hingedly securing the rearward side edge of the bed unit to the lower edge of the back panel.

2. The bed attachment of claim 1 including side panels rigid with the opposite vertical edges of the back panel and projecting forwardly therefrom for reception within the body unit inward of the side walls thereof, said side panels each being of a depth slightly less than the depth of the body unit for a complete reception therein as the back panel assumes the first vertical position thereof.

3. The bed attachment of claim 2 wherein each side panel has a generally triangular filler panel hingedly affixed to the forward edge thereof so as to effect a complete closure of the corresponding end of the bed unit in the horizontally orientated second position thereof, said filler panel being laterally foldable relative to the corresponding side panel in overlying relation to the bed unit in the first upwardly swung vertical position thereof so as to lie thereagainst within the body unit between the vertical bed unit and the front wall of the body unit.

4. The bed attachment of claim 3 wherein the lower chamber of the body unit comprises a storage chamber, said storage chamber having access panels therein, latch means on said access panels for a selective locking thereof, said latch means being located interiorly within said lower storage chamber and being accessible solely from the interior of the storage chamber, said upper chamber and said lower chamber being in direct communication with each other whereby access to the lower chamber is effected through the access opening defined in the front wall.

5. The bed attachment of claim 4 including latch means for releasably locking the back panel, and hence the bed unit, in the second positions thereof, each of said latch units including a latch positioned exteriorly of the rear wall below the back panel, a control rod extending from the latch rotatably through the body unit and beyond the front wall, and a control handle mounted on the rod forward of the front wall whereby a manipulation of the handle will effect a simultaneous manipulation of the latch between the back panel locking position and the back panel releasing position.

6. The bed attachment of claim 5 including retaining means between the back panel and the bed unit, said retaining means selectively and releasably locking the bed unit against the back panel in the second position of the bed unit.

7. The bed attachment of claim 6 wherein said retaining means comprises an elongated cord, the opposite ends of which are engaged with the back panel adjacent the upper portion thereof, and a cord retaining member fixed to the undersurface of the bed unit and selectively receiving the intermediate portion of the cord upon an upward swinging of the bed unit against the back panel.

8. The bed attachment of claim 1 wherein the lower chamber of the body unit comprises a storage chamber, said storage chamber having access panels therein, latch means on said access panels for a selective locking thereof, said latch means being located interiorly within said lower storage chamber and being accessible solely from the interior of the storage chamber, said upper chamber and said lower chamber being in direct communication with each other whereby access to the lower chamber is effected through the access opening defined in the front wall.

9. The bed attachment of claim 1 including latch means for releasably locking the back panel, and hence the bed unit, in the second positions thereof, each of said latch units including a latch positioned exteriorly of the rear wall below the back panel, a control rod extending from the latch rotatably through the body unit and beyond the front wall, and a control handle mounted on the rod forward of the front wall whereby a manipulation of the handle will effect a simultaneous manipulation of the latch between the back panel locking position and the back panel releasing position.

10. The bed attachment of claim 1 including retaining means between the back panel and the bed unit, said retaining means selectively and releasably locking the bed unit against the back panel in the second position of the bed unit, said retaining means comprising an elongated cord, the opposite ends of which are engaged with the back panel adjacent the upper portion thereof, and a cord retaining member fixed to the undersurface of the bed unit and selectively receiving the intermediate portion of the cord upon an upward swinging of the bed unit against the back panel.

References Cited
UNITED STATES PATENTS

| | | | |
|---|---|---|---|
| 1,927,922 | 9/1933 | Crum | 296—37 |
| 3,479,079 | 11/1969 | Coursault | 296—26 |
| 3,402,960 | 9/1968 | Erke | 296—23 |

PHILIP GOODMAN, Primary Examiner

U.S. Cl. X.R.

246—28